(12) United States Patent
Watanabe

(10) Patent No.: US 6,591,088 B1
(45) Date of Patent: Jul. 8, 2003

(54) ASSEMBLY STRUCTURE OF HOUSING FOR PORTABLE COMMUNICATION DEVICE

(75) Inventor: Yohsuke Watanabe, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 09/480,115

(22) Filed: Jan. 10, 2000

(30) Foreign Application Priority Data

Jan. 13, 1999 (JP) ............................................ 11-007028

(51) Int. Cl.[7] .................................................. H04B 1/38
(52) U.S. Cl. .................... 455/90; 455/550; 379/428.01; 379/433.08
(58) Field of Search .......................... 455/90, 550, 575, 455/348; 235/472.01, 472.02; 379/428.01, 429, 433.01, 433.07, 433.08, 440

(56) References Cited

U.S. PATENT DOCUMENTS

| | | | | |
|---|---|---|---|---|
| 5,204,805 A | * | 4/1993 | Takahashi et al. | 455/348 |
| 5,410,141 A | * | 4/1995 | Koenck et al. | 235/472.02 |
| 5,426,286 A | | 6/1995 | Nair et al. | |
| 5,550,712 A | | 8/1996 | Crockett | |
| 5,613,223 A | * | 3/1997 | Ross et al. | 455/575 |
| 5,801,918 A | * | 9/1998 | Ahearn et al. | 235/472.01 |
| 5,963,434 A | * | 10/1999 | Jonsson et al. | 455/90 |

FOREIGN PATENT DOCUMENTS

| | | |
|---|---|---|
| GB | 2 331 888 | 6/1999 |
| JP | 62-71950 | 5/1987 |
| JP | 62-124897 | 8/1987 |
| JP | 2-129787 | 10/1990 |
| JP | 5-78042 | 10/1993 |
| JP | 6-152492 | 5/1994 |
| JP | 7-288569 | 10/1995 |
| JP | 9-321463 | 12/1997 |
| JP | 10-32625 | 2/1998 |

OTHER PUBLICATIONS

J.J. Johnson, "Grounding Scheme for Printed Wiring Board Assemblies Mounted in Injection Moldied Plastic Housings", Motorola Technical Developments, vol. 8, Mar. 1993, pp. 143–144.

Motorola Technical Developments, Ground Scheme For Printed Wiring Board Assemblies in Injection Moulded Plastic Housings, vol. 18, Mar. 1993, Schaumburg, Illinois US, pp 143–144, XP349603; authored by J. Johnson.

* cited by examiner

*Primary Examiner*—Nay Maung
(74) *Attorney, Agent, or Firm*—Sughrue Mion, PLLC

(57) ABSTRACT

A portable communication device has a plurality of projections formed on one or both of an upper casing and a lower casing; a plurality of through holes formed on at least a printed circuit board, on which various types of electronic parts are mounted, housed in a housing so to allow the projections to pierce through them; and the projections designed to pierce through the through holes of the printed circuit board to fix the printed circuit board between the upper casing and the lower casing.

12 Claims, 6 Drawing Sheets

ASSEMBLY STRUCTURE OF HOUSING FOR PORTABLE COMMUNICATION DEVICE

BACKGROUNDS OF THE INVENTION

1. Field of the Invention

The present invention provides a portable communication device which is compact, right-weight, inexpensive and highly reliable and can protect a printed circuit board and electronic part from an impact or an external pressure without using a highly rigid material for a housing.

2. Description of the Relate Art

The portable communication device represented by the portable telephones is being made smaller and lighter in weight to improve portability recently.

However, there is a drawback in strength because a housing, a printed circuit board and the like are made thinner as the device is made smaller and lighter.

To solve such an issue, Japanese Utility Model Application Laid-Open Publication (Kokai) No. Showa 62-124897 proposes a structure to enhance strength of the housing in that a printed circuit board can be made thinner without requiring the printed circuit board to have high strength and can be held finely without warping.

FIG. 8 is a sectional view of a casing to show a structure of the technology disclosed in the aforesaid Japanese Utility Model Application Laid-Open Publication (Kokai) No. Showa 62-124897.

It is seen that a metallic shielding plate 102 is disposed on the back side of a printed circuit board 101, and the metallic shielding plate 102 and the printed circuit board 101 are fixed to a device casing 103 by means of screws 104.

By configuring as described above, the printed circuit board 101 can be made thin without requiring the printed circuit board 101 to have high strength and be held finely without being warped, and the housing can be improved to have high strength.

Furthermore, Japanese Utility Model Application Laid-Open Publication (Kokai) No. Heisei 05-078042 proposes a structure to protect electronic parts having low structural strength by disposing an electronic part having a larger size and higher structural strength on both sides of and close to the electronic parts having lower structural strength, or by disposing an electronic part having a larger size and higher structural strength on both sides of and close to the electronic parts having lower structural strength and forming a recess on the inside surface of the housing at a position corresponding to each electronic part having lower structural strength in order to accommodate the electronic parts having lower structural strength, to prevent any part of the housing from contacting to the electronic parts having low strength in case of application of an external pressure to the housing.

FIG. 9 and FIG. 10 are sectional views of the casing to show the structure of the technology disclosed in the aforesaid Japanese Utility Model Application Laid-Open Publication (Kokai) No. Heisei 05-078042.

FIG. 9 shows that in a compact electronic instrument which accommodates a plurality of electronic parts for configuring an electronic circuit in a housing 201, electronic parts 202, 202 having a larger size and higher structural strength are disposed on both sides of and close to an electronic part 203 having lower structural strength among the aforesaid multiple electronic parts.

In the structure shown in FIG. 10, when the electronic part 203 having lower structural strength is high in height, the electronic parts 202, 202 having a larger size and higher structural strength are disposed on both sides of and close to the electronic part 203, and a recess 204 is formed on the inside wall of the housing 201 to which the electronic part 203 is opposed. The electronic parts with low structural strength can be protected by configuring as described above.

However, the structure disclosed in the aforesaid Japanese Utility Model Application Laid-Open Publication No. Showa 62-124897 has disadvantages of having an increase in thickness and weight due to the use of the metallic shielding plate, and an increase in costs due to an increase in the number of parts and the like.

The structure disclosed in the aforesaid Japanese Utility Model Application Laid-Open Publication No. Heisei 05-078042 has a disadvantage that full protection of the electronic parts cannot be made though the electronic parts having low structural strength can be protected.

SUMMARY OF THE INVENTION

To remedy the aforesaid disadvantages of the prior art, it is an object of the present invention to provide an assembly structure of a housing for a portable communication device which is compact, light in weight, inexpensive and highly reliable and can protect a printed circuit board and electronic parts from an impact or an external pressure without using a highly rigid material for the housing.

According to one aspect of the invention, a portable communication device having a key operation section, a display, a mouthpiece and a receiver on a housing consisting of an upper casing and a lower casing, comprises a plurality of projections formed on one or both of the upper casing and the lower casing, a plurality of through holes formed on at least a printed circuit board, on which various types of electronic parts are mounted, housed in the housing so to allow the projections to pierce through the holes, wherein the projections designed to pierce through the through holes of the printed circuit board to fix the printed circuit board between the upper casing and the lower casing.

In the preferred construction, a plurality of holes are formed on the key operation section in the form of a sheet housed in the housing to allow the projections to pierce through the holes.

In another preferred construction, the projections formed on the upper casing are pierced through the through holes of the printed circuit board, and fixing screws are screwed into the projections through holes formed on the lower casing at positions where the leading ends of the projections come into contact so to integrate the upper casing and the lower casing into one body to fix the printed circuit board between the upper casing and the lower casing.

In another preferred construction, the projections formed on the lower casing are pierced through the through holes of the printed circuit board, and fixing screws are screwed into the projections through holes formed on the upper casing at positions where the leading ends of the projections come into contact so to integrate the upper casing and the lower casing into one body to fix the printed circuit board between the upper casing and the lower casing.

In another preferred construction, the projections formed on the upper casing and the lower casing are pierced through the holes formed on the printed circuit board, and protrusions formed on the leading ends of the projections on either of the upper casing or the lower casing are inserted into recesses formed on the leading ends of the projections of the other casing so to integrate the upper casing and the lower casing into one body to fix the printed circuit board between the upper casing and the lower casing.

In another preferred construction, the projections formed on the upper casing and the lower casing are pierced through the holes formed on the printed circuit board, and fixing screws inserted from recesses formed in the projections of either of the upper casing or the lower casing are screwed into the leading ends of the projections of the other casing to integrate the upper casing and the lower casing into one body to fix the printed circuit board between the upper casing and the lower casing.

In another preferred construction, holes are formed on the casing to allow the projections to pierce through the holes, the projections formed on the upper casing are pierced through the through holes of the printed circuit board and also the holes of the lower casing, and fixing screws are screwed into the projections from the outside of the holes of the lower casing to integrate the upper casing and the lower casing into one body so to fix the printed circuit board between the upper casing and the lower casing.

Preferably, the structure is applied to a portable telephone.

Other objects, features and advantages of the present invention will become clear from the detailed description given herebelow.

BRIEF DESCRIPTION OF THE DRAWINGS

The present invention will be understood more fully from the detailed description given herebelow and from the accompanying drawings of the preferred embodiment of the invention, which, however, should not be taken to be limitative to the invention, but are for explanation and understanding only.

In the drawings.

DESCRIPTION OF THE PREFERRED EMBODIMENT

The preferred embodiment of the present invention will be discussed hereinafter in detail with reference to the accompanying drawings. In the following description, numerous specific details are set forth in order to provide a thorough understanding of the present invention. It will be obvious, however, to those skilled in the art that the present invention may be practiced without these specific details. In other instance, well-known structures are not shown in detail in order to unnecessary obscure the present invention.

Figure 1:
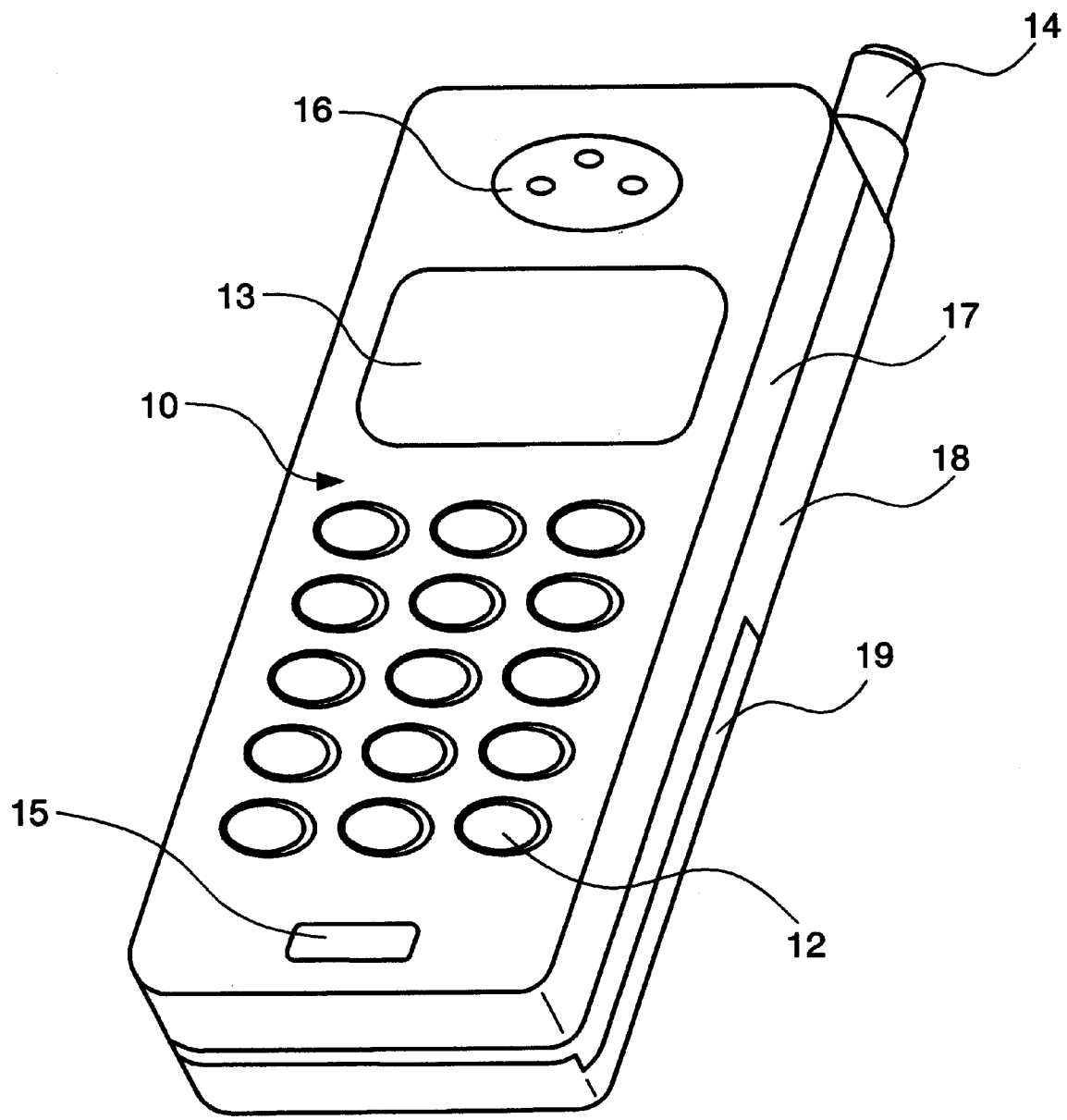
FIG. 1 is a perspective view of a portable communication device according to a first embodiment of the present invention.
Figure 2:
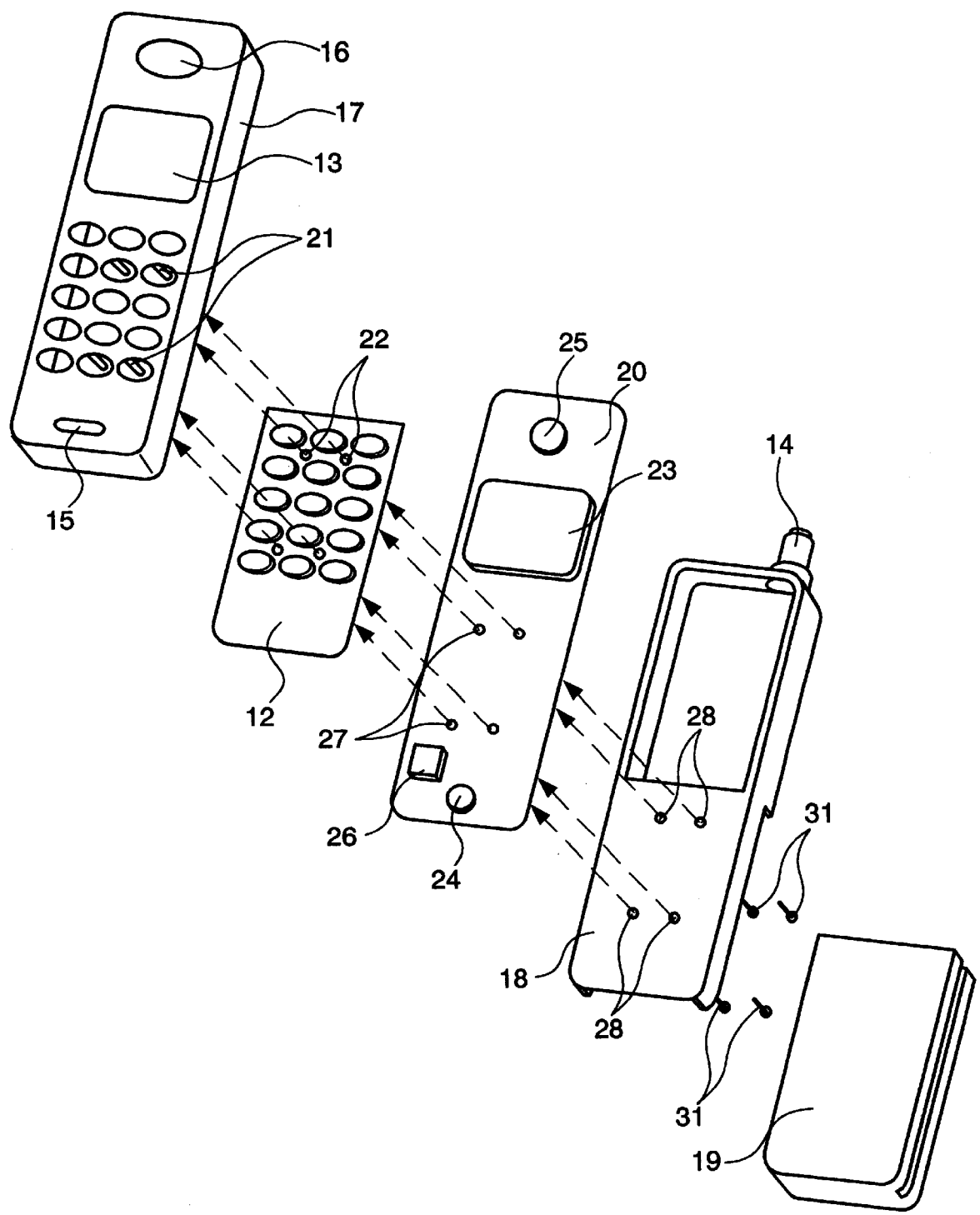
FIG. 2 is an exploded perspective view of the portable communication device according to the first embodiment of the present invention.

FIG. 1 is a perspective view of a portable communication device according to a first embodiment of the present invention. FIG. 2 is an exploded perspective view of the portable communication device.

Referring to FIG. 1, a portable communication device 10 according to the present invention includes a key operation section 12, a display 13, an antenna 14, a mouthpiece 15, a receiver 16, an upper casing 17, a lower casing 18 and a battery pack 19.

Referring to FIG. 2, components of the portable communication device 10 of the present invention generally comprise the upper casing 17, the key operation section 12 made of a flexible sheet, a printed circuit board 20 on which various types of electronic parts are mounted, the lower casing 18, and the battery pack 19.

A plurality (four in the embodiment) of projections 21 are formed on the back of the upper casing 17. Holes 22 and 27 are respectively formed on the key operation section 12 and the printed circuit board 20 at positions corresponding to the projections 21 formed on the back of the upper casing 17 so that the projections 21 can pierce through them. Holes 28 are also formed on the lower casing 18 at positions to correspond with the projections 21 so to pass fixing screws 31.

A screw hole is formed on the leading ends of the projections 21 of the upper casing 17 so to allow the fixing screw 31 to be screwed in it. The holes 28 of the lower casing 18 have a diameter smaller than that of the projections 21, so that the leading ends of the projections 21 do not pierce through the holes 28 but come in contact with the back of the lower casing 18.

Figure 3:
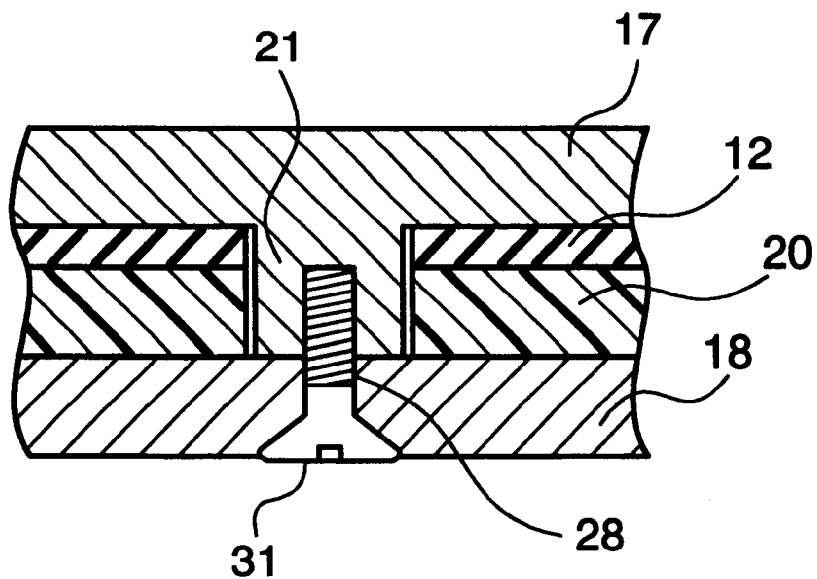
FIG. 3 is a partially sectional view of the portable communication device according to the first embodiment of the present invention.

As shown in FIG. 3, when the upper casing 17 and the lower casing 18 are mutually assembled with the key operation section 12 and the printed circuit board 20 held between them, the projections 21 formed on the back of the upper casing 17 pierce through the holes 22, 27 formed on the key operation section 12 and the printed circuit board 20 to come into contact with the lower casing 18. And, the projections 21 are fixed by the fixing screws 31 which are inserted through the holes 28 formed on the lower casing 18.

Many electronic parts such as LCD 23, a microphone 24, a speaker 25, LSI 26 are mounted on the printed circuit board 20.

Since the portable communication device 10 of the first embodiment is configured as described above, even if an external pressure is applied to the upper casing 17 of the device, the upper casing 17 is not bent by the external pressure because the upper casing 17 is supported by the projections 21 formed on the back of the upper casing 17 which are allowed to pierce through the holes 22, 27 formed on the key operation section 12 and the printed circuit board 20 and to come into contact with the lower casing 18.

Thus, the upper casing 17 is prevented from being broken by the external pressure, and the portable communication device 10 can be kept to have high reliability.

Furthermore, the projections 21 serve to prevent the application of the external pressure to the printed circuit board 20 and the multiple electronic parts such as the LCD 23, the microphone 24, the speaker 25 and the LSI 26 mounted on the printed circuit board 20.

Thus, the printed circuit board 20 and the multiple electronic parts such as the LCD 23, the microphone 24, the speaker 25 and the LSI 26 mounted on the printed circuit board 20 are amply protected from the external pressure and prevented from being broken. Accordingly, the portable communication device 10 can be kept to have high reliability.

Now, a portable communication device according to a second embodiment of the present invention will be described with reference to FIG. 4.

Figure 4:
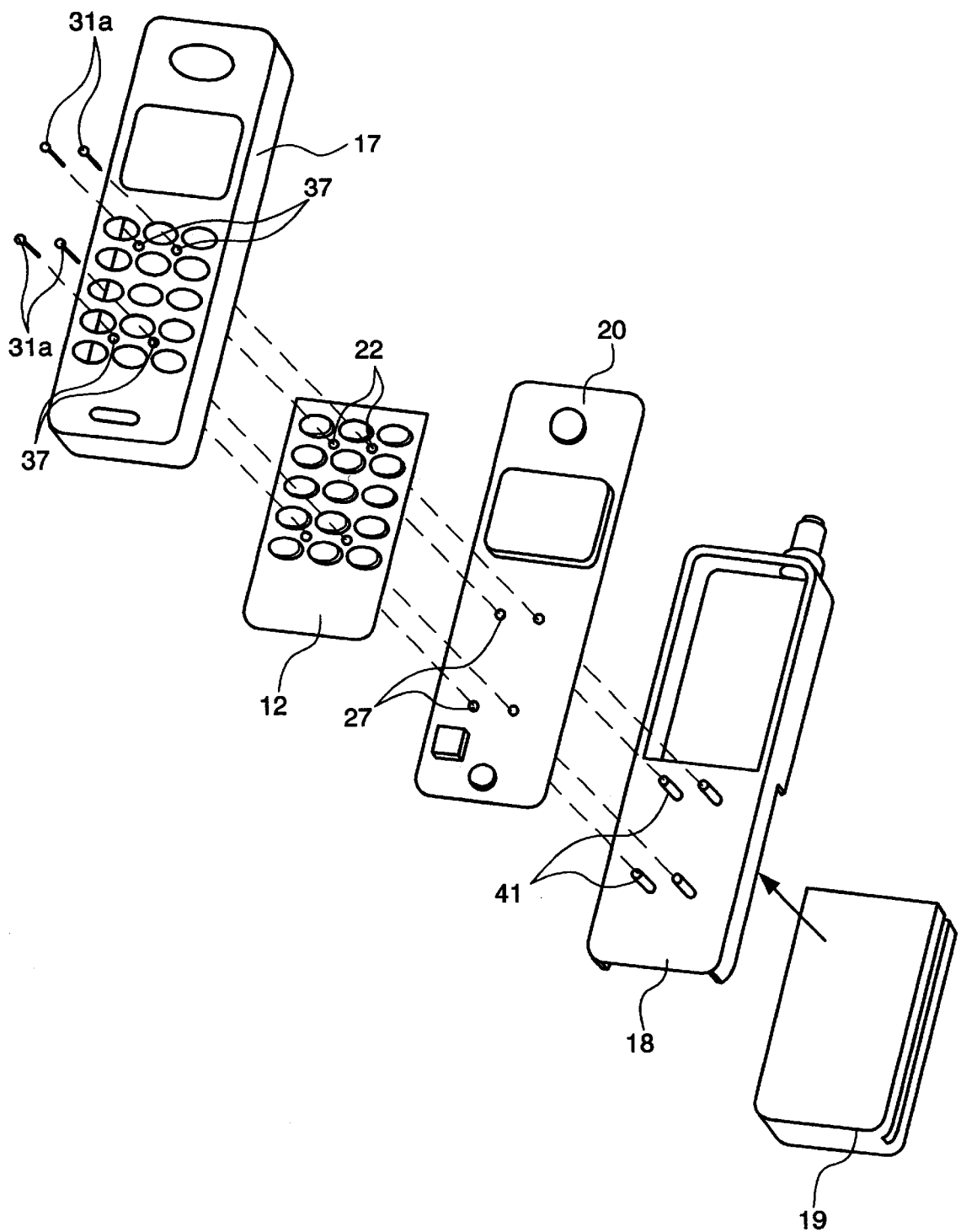
FIG. 4 is an exploded perspective view of a portable communication device according to a second embodiment of the present invention.

As shown in FIG. 4, the projections piercing through the holes 22, 27 formed on the key operation section 12 and the printed circuit board 20 are not limited to be formed on the upper casing 17 but may be formed on the lower casing 18.

In this embodiment, projections 41 are formed on a lower casing 81. These projections 41 are designed to be fixed by means of fixing screws 31a which are pierced through holes 37 formed on the upper casing 17. In this case, the holes 37 of the upper casing 17 have a diameter smaller than that of the projections 41, so that the leading ends of the projections 41 do not pierce through the holes 37 but come into contact with the back of the upper casing 17.

In the second embodiment, the portable communication device 10 can be kept to have high reliability because an external pressure applied to the upper casing 17 and the lower casing 18 is received by the projections 41 in the same way as above.

Figure 5:
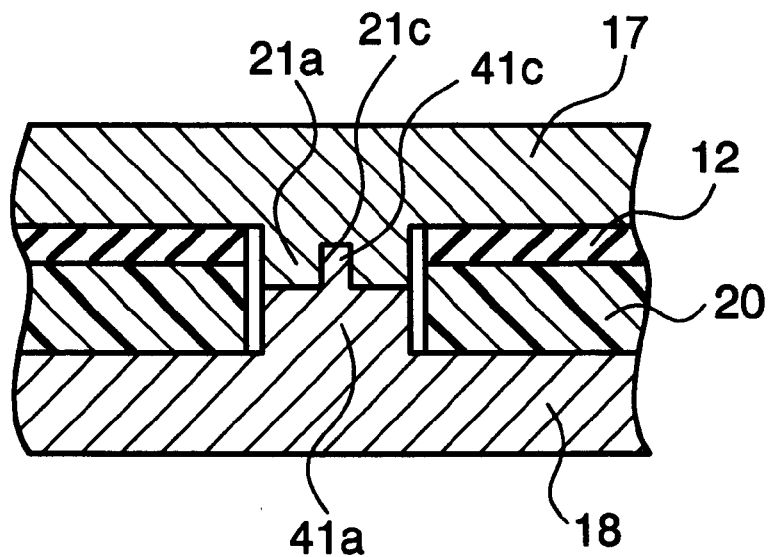
FIG. 5 is a diagram showing a second example of a fixing structure by means of a projection part of the portable communication device according to the present invention.

It may be configured as shown in FIG. 5 that projections 21a, 41a piercing through the holes 22, 27 formed on the key operation section 12 and the printed circuit board 20 are formed on both of the upper casing 17 and the lower casing 18 so to mutually join the projections 21a and 41a at the middle. In this case, a protrusion is formed at the leading end of one of the projections, and a recess in which the protrusion is inserted is formed on the other. FIG. 5 shows that a recess 21c is formed at the leading end of a projection 21a of the upper casing 17, and a protrusion 41c which is tightly inserted into the recess 21c is formed on the projection 41a of the lower casing 18. According to this embodiment, no fixing screw is required.

Figure 6:
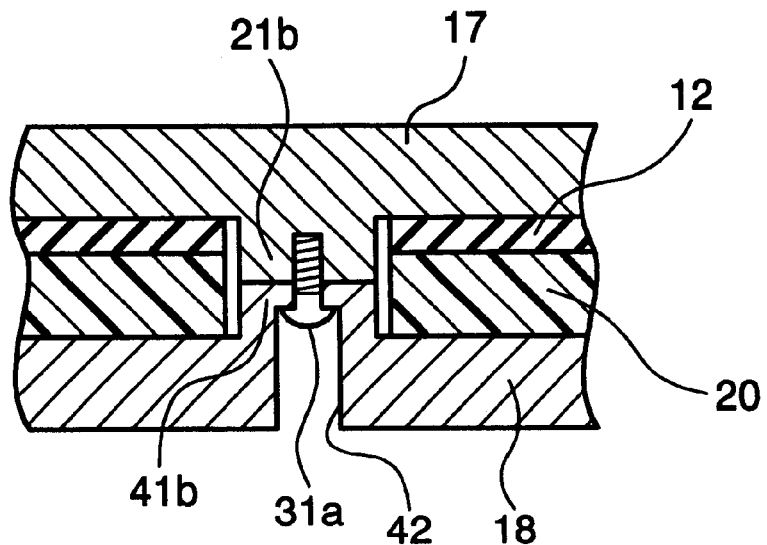
FIG. 6 is a diagram showing a third example of the fixing structure by means of a projection part of the portable communication device according to the present invention.

Furthermore, a through hole for passing the fixing screw may be formed on one of the projections. FIG. 6 shows that a through hole 42 for passing a fixing screw 31a which is screwed into the leading end of the a projection 21b of the upper casing 17 is formed on the projection 41b of the lower casing 18.

The projections 21 piercing through the holes 22, 27 formed on the key operation section 12 and the printed circuit board 20 may be located at any position of the casings as far as they can be mounted, and the number of projections is not limited.

Figure 7:
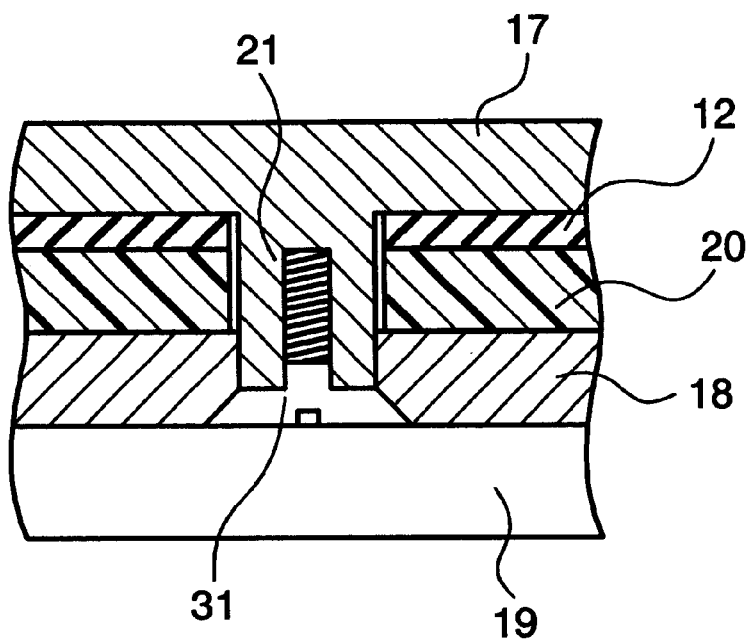
FIG. 7 is an embodiment showing a fourth example of the fixing structure by means of a projection part of the portable communication device according to the present invention.
Figure 8:
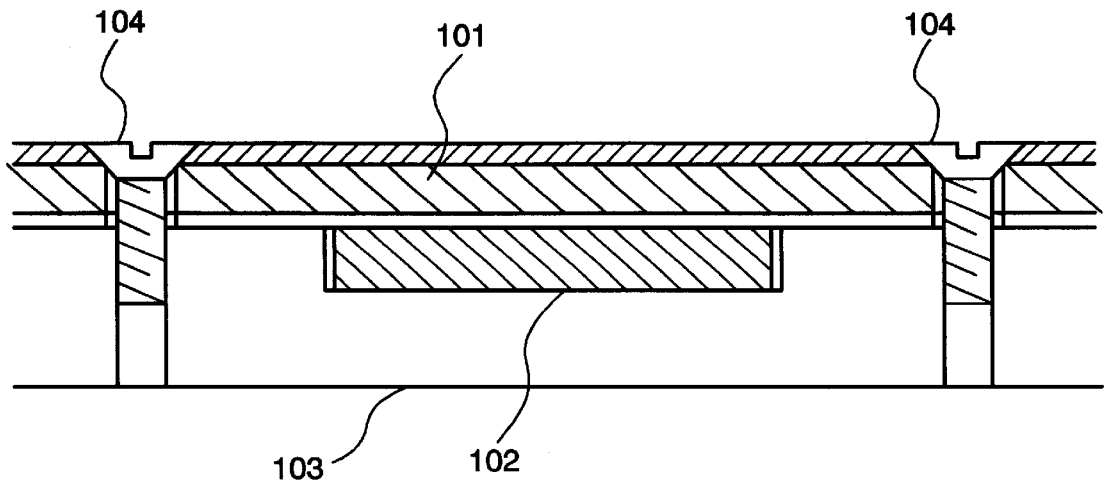
FIG. 8 is a diagram showing an example of a supporting structure for a housing and a printed circuit board of a conventional portable communication device.
Figure 9:
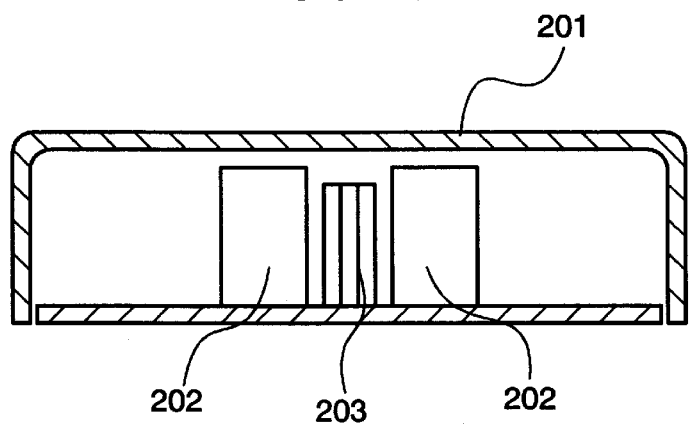
FIG. 9 is a sectional view showing an example of arrangement structure of electronic parts of a conventional portable communication device.
Figure 10:
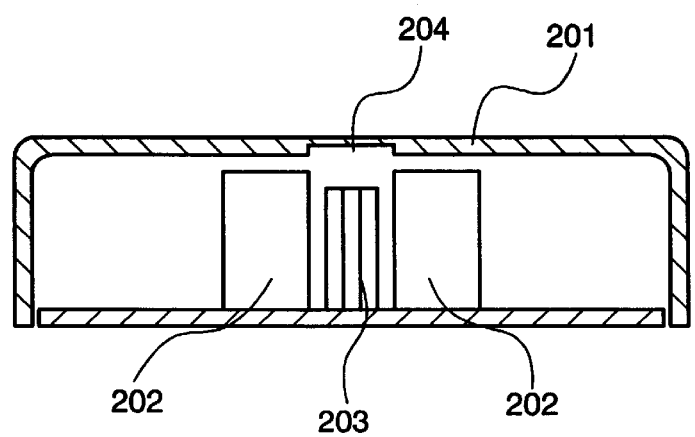
FIG. 10 is a sectional view showing another example of arrangement structure of electronic parts of the conventional portable communication device.

As shown in FIG. 7, it may also be configured that the projections 21 piercing through the holes 22, 27 formed on the key operation section 12 and the printed circuit board 20 pierce through the holes 28 of the lower casing 18, and the fixing screws 31 are screwed in from the outside of the holes 28. Thus, an external pressure applied to the projections 21 is received by the battery pack 19 via the fixing screws 31.

This embodiment provides an additional effect of protecting the electronic parts such as the printed circuit board 20 and LSI 26 from an impact or an external pressure by virtue of strength of the battery pack 19.

With the portable communication device according to the present invention configured as described above, even when an external pressure is applied to the housing, the housing casing is not bent. Thus, the housing can be protected and the inside printed circuit board can be protected effectively, because the projections are formed to pierce through the key operation section and the printed circuit board.

Further, when an external pressure is applied to the housing, the multiple electronic parts mounted on the printed circuit board can be protected because the external pressure is not applied to the multiple electronic parts mounted on the printed circuit board.

In addition, the projections serve to assist positioning to assemble the key operation section and the printed circuit board, thereby enabling to improve an assembling property.

Although the invention has been illustrated and described with respect to exemplary embodiment thereof, it should be understood by those skilled in the art that the foregoing and various other changes, omissions and additions may be made therein and thereto, without departing from the spirit and scope of the present invention. Therefore, the present invention should not be understood as limited to the specific embodiment set out above but to include all possible embodiments which can be embodies within a scope encompassed and equivalents thereof with respect to the feature set out in the appended claims.

What is claimed is:

1. A portable communication device having a key operation section, a display, a mouthpiece and a receiver on a housing comprising an upper casing and a lower casing, said device comprising:

a plurality of projections formed on and extending away from an inside surface of one or both of said upper casing and said lower casing;

a printed circuit board; and a plurality of through holes formed in at least said printed circuit board to allow the projections to pierce through the holes, wherein said projections pierce through said through holes of said printed circuit board to fix said printed circuit board between said upper casing and said lower casing, and wherein a plurality of holes are formed on said key operation section in the form of a sheet housed in the housing to allow said projections to pierce through the holes.

2. The portable communication device according to claim 1, wherein said projections formed on said upper casing are pierced through said through holes of said printed circuit board, and fixing screws are screwed into said projections through holes formed on said lower casing at positions where the leading ends of the projections come into contact so to integrate said upper casing and said lower casing into one body to fix said printed circuit board between said upper casing and said lower casing.

3. The portable communication device according to claim 1, wherein said projections formed on said lower casing are pierced through said through holes of said printed circuit board, and fixing screws are screwed into said projections through holes formed on said upper casing at positions where the leading ends of said projections come into contact so to integrate said upper casing and said lower casing into one body to fix said printed circuit board between said upper casing and said lower casing.

4. The portable communication device according to claim 1, wherein said projections formed on said upper casing and said lower casing are pierced through the holes formed on said printed circuit board, and protrusions formed on the leading ends of said projections on either of said upper casing or said lower casing are inserted into recesses formed on the leading ends of said projections of the other casing so to integrate said upper casing and said lower casing into one body to fix said printed circuit board between said upper casing and said lower casing.

5. The portable communication device according to claim 1, wherein said projections formed on said upper casing and said lower casing are pierced through the holes formed on said printed circuit board, and fixing screws inserted from recesses formed in said projections of either of said upper casing or said lower casing are screwed into the leading ends of said projections of the other casing to integrate said upper casing and said lower casing into one body to fix said printed circuit board between said upper casing and said lower casing.

6. The portable communication device according to claim 1, wherein holes are formed on the casing to allow said projections to pierce through the holes, said projections formed on said upper casing are pierced through said through holes of said printed circuit board and also the holes of said lower casing, and fixing screws are screwed into said projections from the outside of the holes of said lower casing to integrate said upper casing and said lower casing into one body so to fix said printed circuit board between said upper casing and said lower casing.

7. The portable communication device according to claim 1, wherein the structure is applied to a portable telephone.

8. A portable communication device having a key operation section, a display, a mouthpiece and a receiver on a housing comprising an upper casing and a lower casing, said device comprising:
- a plurality of projections formed on and extending away from an inside surface of one or both of said upper casing and said lower casing;
- a printed circuit board; and
- a plurality of through holes formed in at least said printed circuit board to allow the projections to pierce through the holes,
- wherein said projections pierce through said through holes of said printed circuit board to fix said printed circuit board between said upper casing and said lower casing, and
- a battery, wherein said battery is disposed between said upper casing and said lower casing, said battery forming a-structural member for strengthening said upper and lower casings.

9. A portable communication device having a key operation section, a display, a mouthpiece, and a receiver, comprising:
- a housing including an upper casing and a lower casing;
- at least one printed circuit board, on which various types of electronic parts are mounted, housed within said housing and including a plurality of through holes formed in said at least one printed circuit board,
- a plurality of first projections formed on and extending independently from an inside surface of said upper casing; and
- a plurality of second projections formed on and extending independently from an inside surface of said lower casing;
- wherein at least one of said plurality of first and second projections pierce through one of said holes in said printed circuit board to secure and support said printed circuit board within said housing, and
- wherein said plurality of first and second projections secure and support said upper casing and said lower casing.

10. The portable communication device according to claim 9, wherein said plurality of first and second projections are mutually joined at a position that is substantially between said upper casing and said lower casing.

11. The portable communication device according to claim 9, wherein at least one of said plurality of projections includes:
- a protrusion at a leading edge of at least one of said plurality of projections; and
- a recess at a leading edge of a corresponding projection;
- wherein said protrusion is inserted into said recess for securing said upper casing to said lower casing.

12. The portable communication device according to claim 11, wherein at least one of said plurality of projections further includes:
- a through hole formed on the leading edge of said projection; and
- a screw for securing said projection to a corresponding projection.

* * * * *